United States Patent [19]

Washizu

[11] Patent Number: 4,997,216
[45] Date of Patent: Mar. 5, 1991

[54] CONNECTOR FOR CONNECTING SMALL DIAMETER PIPE

[75] Inventor: Katsushi Washizu, Sunto, Japan

[73] Assignee: Usui Kokusai Sangyo Sangyo Kaisha, Ltd., Japan

[21] Appl. No.: 408,889

[22] Filed: Sep. 18, 1989

[30] Foreign Application Priority Data

Sep. 20, 1988 [JP] Japan ............... 63-122986[U]

[51] Int. Cl.⁵ .................................... F16L 39/00
[52] U.S. Cl. .................... 285/319; 285/921; 285/906
[58] Field of Search ............ 285/319, 320, 921, 906

[56] References Cited

U.S. PATENT DOCUMENTS

| | | | |
|---|---|---|---|
| 922,805 | 5/1909 | Nelson et al. | 285/921 X |
| 2,892,991 | 6/1959 | Beebee et al. | |
| 3,169,030 | 2/1965 | Lippincott | |
| 3,453,005 | 7/1969 | Foults | |
| 3,826,523 | 7/1974 | Eschbaugh | |
| 3,933,378 | 1/1976 | Sandford et al. | |
| 4,026,581 | 5/1977 | Pasbrig | |
| 4,035,005 | 7/1977 | DeVincent et al. | |
| 4,074,912 | 2/1978 | Van Bilderbeek et al. | |
| 4,275,907 | 6/1981 | Hunt | |
| 4,451,069 | 5/1984 | Melone | |
| 4,637,636 | 1/1987 | Guest | |
| 4,637,640 | 1/1987 | Fournier et al. | |
| 4,681,351 | 7/1987 | Batholomew | |
| 4,730,856 | 3/1988 | Washizu | 285/319 |
| 4,749,214 | 6/1988 | Hoskins et al. | |
| 4,753,458 | 6/1988 | Case et al. | |
| 4,776,616 | 10/1988 | Umehara et al. | |
| 4,778,203 | 10/1988 | Bartholomew | |
| 4,781,400 | 11/1988 | Cunningham | |
| 4,793,637 | 12/1988 | Laipply et al. | |
| 4,802,696 | 2/1989 | Chohen et al. | 285/319 X |
| 4,875,709 | 10/1989 | Caroll et al. | 285/319 X |

FOREIGN PATENT DOCUMENTS 593413  5/1959  Italy .
855603  12/1960  United Kingdom .

*Primary Examiner*—Dave W. Arola
*Attorney, Agent, or Firm*—Anthony J. Casella; Gerald E. Hespos

[57] ABSTRACT

There is disclosed a connector for connecting a small diameter pipe, having a connector body and a socket member. The connector body formed with a small diameter chamber accommodating sealing members and a bush and an enlarged-diameter chamber provided with a retaining wall. The socket member has oppositely protruded pawl walls. The pawl walls engage with retaining holes formed in the enlarged-diameter chamber, thus incorporating the socket member thereinto. The socket member also has a notch to assume a C-shape in section and at least one pair of protruded walls engaging with the retaining holes.

11 Claims, 1 Drawing Sheet

CONNECTOR FOR CONNECTING SMALL DIAMETER PIPE

BACKGROUND OF THE INVENTION

1. Field of the Invention

The present invention is directed to a structural improvement of a connector for connecting a resinous tube or a metallic pipe (hereinafter simply referred to as a pipe having a relatively small diameter less than approximately 20 m/m, the pipe being arranged as a supply passageway for supplying the air and oil generally to an automobile or a variety of machineries, equipments and so forth.

2. Description of the Prior Art

This type of conventional connector for connecting the pipe is constructed in the following manner. As illustrated in FIG. 4, a connector body (21) includes a stepped enlarged-diameter chamber (22) and a small diameter chamber which are so formed in an interior of an axial core thereof as to communicate with a communication bore formed in a top part. The connector body (21) also has a retaining wall (21') provided along a peripheral wall portion at a rear end. Mounted in the enlarged-diameter chamber (22) of the connector body (21) is a socket member (23) having a cylindrical proximal part and pawl walls (23' and 23") protruded obliquely forwards on portions standing vis-á-vis with each other on the side of the top part. Substantially proximal parts of the pawl walls are securely fitted in o retaining holes (22' and 22") defined as slots perforated in the peripheral wall of the enlarged-diameter chamber (22) of the connector body (21). A swollen wall provided on the connecting side of a pipe (P') is incorporated in an interior of the enlarged-diameter chamber (22) so that the tops of the pawl walls (23' and 23") resiliently engage therewith, thus connecting the pipe.

In the prior art arrangement, however, the structure that the proximal part of the socket member (23) assumes a cylindrical configuration entails such troublesome operations incidental to deformation that the socket member (23) is inserted from the rear of the enlarged-diameter chamber (22) to permit the peripheral walls of the substantially proximal parts of the pawl walls (23' and 23") to pass through the inside of retaining wall (21') while contracting a diameter of the pawl walls (23' and 23"), thus effecting the engagement with the retaining wall (21'). Besides, the socket member (23) is shaped to have a relatively large diameter in connection with snapping of the pawl walls (23' and 23") when connecting the pipe (P'), and hence the whole product including the connector body (21) is constructed inevitably to have a large diameter. There arises, as a matter of course, a problem in which the pipe arrangement in narrow places disadvantageously causes interference with other parts. An additional problems is that since the pawl walls (23 and 23") increase in length due to the large diameter, the resilient engaging force at the swollen wall of the pipe (P') is weakened, resulting in an ill-connected condition combined with fatigues in a long stretch of use.

SUMMARY OF THE INVENTION

It is a primary object of the present invention, which is devised to obviate the foregoing problems inherent in the prior art device, to provide a connector for connecting a small diameter pipe, which is capable of facilitating an operation of fitting a socket member to a connector body, shaping the socket member to have a relatively small diameter for making an entire product compact, eliminating an anxiety for inconveniences such as interference in narrow places on the occasion of pipe arrangement and keeping a well-connected condition for a long period of time by securing resilient press on a pipe swollen wall.

To accomplish this object, according to one aspect of the invention, there is provided a connector for connecting a small diameter pipe, comprising: a connector body; a stepped small diameter chamber so formed in an interior of an axial core thereof as to communicate with a communication bore formed in a top part; a stepped enlarged-diameter chamber formed in the axial core interior in rear of the small diameter chamber; sealing members set in the small diameter chamber of the connector body having a retaining wall conceived as a peripheral wall at a rear end of the enlarged-diameter chamber; an annular bush having a collar wall engaging with a stepped portion on the side of the enlarged chamber and securely inserted in rear of the sealing members by holding these sealing members; another socket member having pawl walls protruded obliquely forwards on portions standing vis-á-vis with each other on the side of the top part and fitted in retaining holes perforated substantially in a peripheral wall of the enlarged-diameter chamber so that a peripheral wall of another socket member engages with the retaining holes; and an outwardly swollen annular wall provided on the side of pipe connecting side is incorporated in an interior of the enlarged-diameter chamber so that the pawl walls resiliently engage therewith to connect the pipe, characterized in that the socket member incorporated in the enlarged-diameter chamber has its peripheral wall formed with a notch to assume a C-shape in section, at least one pair of protruded walls standing vis-á-vis with each other and engaging with the retaining holes are provided on an exterior of the peripheral wall, and pawl walls inclined forwards are protruded on portions opposite to each other on the side of the top part.

Based on this construction according to the present invention, the socket member including its notched peripheral wall assumes the C-shape in section. With this arrangement, it is possible to facilitate a mounting operation because of contraction in diameter thereof when being incorporated into in the interior of the enlarged-diameter chamber of the connector body, diminish the diameter of the socket member with the result that the product can be made compact on the whole as a diameter of the connector body decreases, eliminate, as a matter of course, inconveniences such as interference in narrow places when effecting the pipe arrangement, exhibit a sufficient strength of resilient engagement of the swollen wall of the pipe owing to the relatively short pawl walls, and further surely keep a well-conditioned connection in a long stretch of use.

BRIEF DESCRIPTION OF THE DRAWINGS

Other objects and advantages of the invention will become apparent during the following discussion taken in conjunction with the accompanying drawings, in which.

DETAILED DESCRIPTION OF PREFERRED EMBODIMENTS

Figure 1:
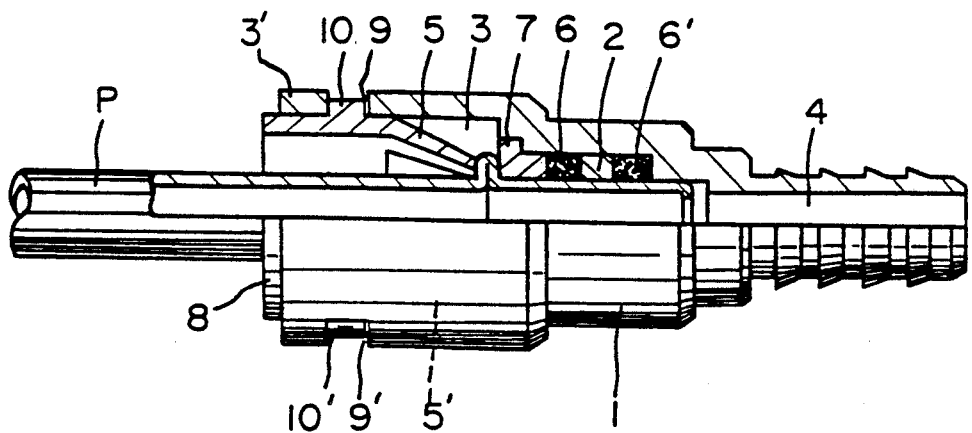
FIG. 1 is a partly cut-away vertical sectional view illustrating a connector for connecting a small diameter pipe when being connected in one embodiment of the present invention.
Figure 3:
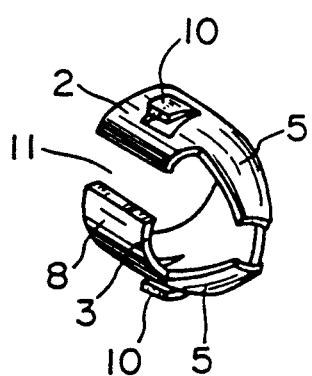
FIG. 3 is a view similar to FIG. 2, showing another embodiment of the invention.
Figure 2:
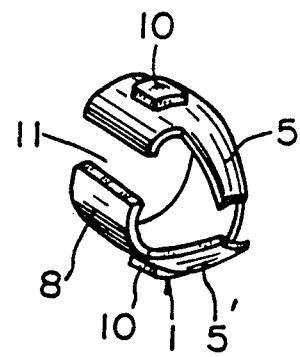
FIG. 2 is a perspective view depicting a socket member of FIG. 1.
Figure 4:
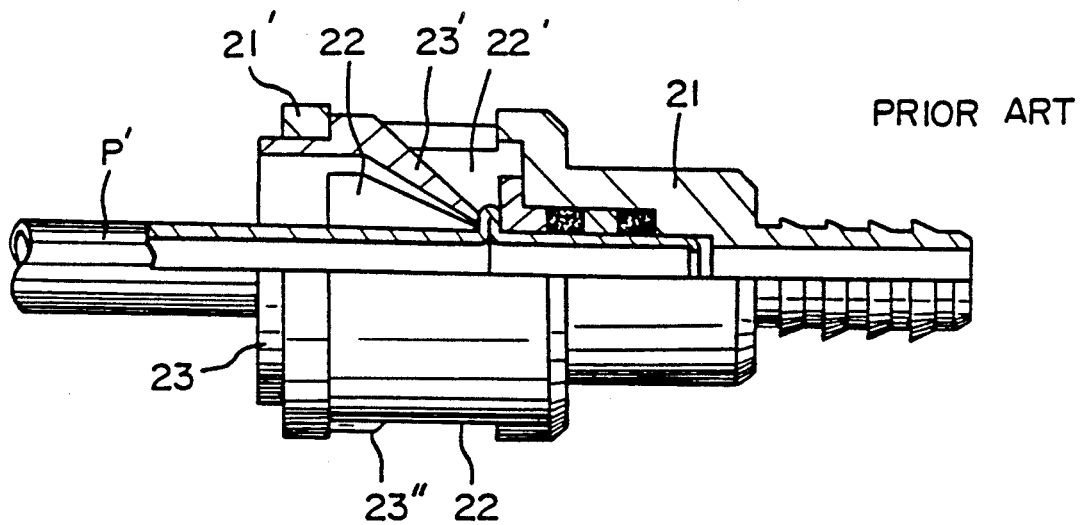
FIG. 4 is a partly cut-away vertical sectional view illustrating a prior art connector when a pipe is connected.

Referring to FIGS. 1 to 3, designated at (1) is a connector body including a stepped small diameter chamber so formed in an interior of an axial core thereof as to communicate with a communication bore (4) provided with a connecting cylindrical wall to a resinous tube or a rubber hose (not illustrated) on the side of a top part and a stepped enlarged-diameter chamber (3) disposed in rear of the small diameter chamber (2), the chamber (3) having its rear end peripheral wall serving as a retaining wall (3'). A plurality of sealing members (6 and 6') each composed of an elastic material such as rubber are, as is desired, incorporated through spacers or the like in the enlarged-diameter chamber (3). Securely inserted behind the sealing members is a short annular bush formed with a collar wall engaging with the stepped portion to hold the sealing members. The numeral (8) represents a separately provided socket member formed of a metal spring tabular member or a resinous member. The socket member (8) includes a notched portion (11) incised in the peripheral wall thereof to assume a C-shape in section. Furthermore, at least one pair of protruded walls (10 and 10') standing vis-á-vis with each other are shaped on an exterior of the peripheral wall, and pawl walls (5 and 5') inclined forwards are protruded on portions opposite to each other on the side of the top part. Using the pawl walls (5 and 5'), there is effected resilient engagement of an outwardly swollen annular wall provided on the connecting side of a pipe (P) fitted and incorporated into the interior of the enlarged-diameter chamber (3). At the same time, the protruded walls (10 and 10') engage with retaining holes (9 and 9') perforated in the vicinity of the peripheral wall at the rear end of the enlarged-diameter chamber (3), thus securing the socket member (8). Note that construction of the socket member (8) involves the use of a flat plate composed of a metal spring tabular member by stamping or bending; and the protruded walls (10 and 10') may, if necessary, be formed in a tongue-like shape (FIG. 3) on the peripheral wall.

As discussed above, in the connector for connecting the small diameter pipe according to the present invention, particularly the protruded walls (10 and 10'), which are provided on the peripheral wall of the socket member (8) including the notched portion (11) incised in the peripheral wall to assume the C-shape in section, engage with the retaining holes (9 and 9') on the side of the connector body (1), thus securing the socket member (8). With this arrangement, the diminution in diameter owing to the notched portion (11) facilitates the step of mounting the socket member (8) without causing troublesomeness in operation. The socket member (8) itself can generally be reduced in diameter, thereby making the whole product compact. This in turn eliminates an anxiety for inconveniences such as interference in narrow places on the occasion of pipe arrangement. In addition, the relatively short pawl walls (5 and 5') contributes to exhibit the sufficient resilient engagement of the swollen wall of the pipe (P). As a result, it is possible to maintaining the secure connection for a long period of time and facilitate the production at low costs, because the socket member can be manufactured simply by stamping or bending the flat plate composed of the metal spring tabular member. Thus, the highly useful connector for connecting the small diameter pipe can be provided.

Although the illustrative embodiments of the present invention have been described in detail with reference to the accompanying drawings, it is to be understood that the invention is not limited to those precise embodiments. Various changes or modifications may be effected therein by one skilled in the art without departing from the scope or spirit of the invention.

What is claimed is:

1. A connector for connecting a small diameter pipe having opposed first and second ends and an annular outwardly swollen wall spaced from said first end, said connector comprising:

a connector body having opposed forward and rearward ends, a communication bore extending into the forward end of the connector body, a small diameter chamber disposed rearwardly of the communication bore and in communication therewith, generally annular sealing means disposed in the small diameter chamber, said annular sealing means being dimensioned to receive the first end of the pipe therein, a large diameter chamber of substantially uniform diameter extending into the rear end of the connector body and communicating with the small diameter chamber, said large diameter chamber being dimensioned to receive the annular swollen portion of the pipe therein, a peripheral wall defining a portion of said connector body surrounding the large diameter chamber and being provided with a plurality of retaining holes perforated therethrough; and a socket member having a generally cylindrical peripheral wall with opposed forward and rearward ends and an outer circumference dimensioned for slidable insertion of the socket member in the large diameter chamber of the connector body, said peripheral wall of said socket member including a notch extending from the forward end to the rearward end thereof such that said peripheral wall of said socket member assumes a generally C-shaped cross section, a plurality of pawl walls protruding obliquely forwardly and radially inwardly from the forward end of said peripheral wall of the socket member, said pawl walls including forward surfaces for engaging the annular swollen wall of the pipe, a plurality of protrusion means projecting outwardly from the peripheral wall of the socket member intermediate the forward and rearward ends and spaced rearwardly of the pawl walls and engaging the respective retaining holes in the peripheral wall of the connector body, whereby the engagement of the protrusion means with the retaining holes and the engagement of the forward surfaces of the pawl walls with the annular swollen wall of the pipe retains the pipe in the connector body.

2. The connector as set forth in claim 1, wherein said protrusion means are protruded walls protruding from said peripheral wall.

3. The connector as set forth in claim 1, wherein said protrusion means are composed of tongue-like members provided on said peripheral wall.

4. The connector as set forth in claim 1, wherein said socket member is composed of a metal spring tabular member.

5. The connector as set forth in claim 1, wherein said pipe consists of a metallic pipe.

6. The connector as set forth in claim 1, wherein said pipe consists of a resinous tube.

7. The connector as set forth in claim 1 wherein the socket member is stamped from a unitary piece of spring metal.

8. The connector as set forth in claim 7 wherein the protrusion means is stamped from the peripheral wall of the socket member.

9. The connector as set forth in claim 7 wherein the protrusion means is stamp formed to include edge regions for engaging the associated retaining hole in the connector body.

10. The connector as set forth in claim 1 wherein the plurality of pawl walls defines two pawl walls projecting from opposed portions of the forward end of the peripheral wall of the socket member.

11. The connector as set forth in claim 1 wherein the plurality of retaining holes defines two retaining holes separated from one another by approximately 180°, and wherein the plurality of protrusion means on the socket member defines two protrusion means disposed for engagement with the retaining holes of the connector body, the notch of the socket member extending longitudinally at a location approximately equally spaced between the protrusion means of the socket member.

* * * * *